(12) United States Patent
Kennedy et al.

(10) Patent No.: US 7,421,352 B2
(45) Date of Patent: Sep. 2, 2008

(54) NETWORK-ENABLED ELECTRICAL POWER EQUIPMENT WITH INTEGRATED CONTENT MANAGEMENT SYSTEM

(75) Inventors: Robert A. Kennedy, Murfreesboro, TN (US); Michael W. Pyle, Hermitage, TN (US); Randi Sue Dolan, Murfreesboro, TN (US)

(73) Assignee: Square D Company

( * ) Notice: Subject to any disclaimer, the term of this patent is extended or adjusted under 35 U.S.C. 154(b) by 218 days.

(21) Appl. No.: 11/400,868

(22) Filed: Apr. 10, 2006

(65) Prior Publication Data
US 2007/0239870 A1 Oct. 11, 2007

(51) Int. Cl.
*G06K 15/00* (2006.01)
(52) U.S. Cl. .......................... 702/61; 702/62; 709/217; 340/870.02; 700/286
(58) Field of Classification Search .................. 702/61, 702/62; 709/217, 224, 200, 201, 203, 218, 709/219; 340/506, 511, 517, 521, 531, 533, 340/679, 3.1, 825.36, 825.49; 375/222; 128/904; 700/286, 291, 292, 297, 293, 296
See application file for complete search history.

(56) References Cited
U.S. PATENT DOCUMENTS

| | | | | |
|---|---|---|---|---|
| 5,796,347 | A * | 8/1998 | Zulaski | 340/635 |
| 6,522,247 | B2 * | 2/2003 | Maruyama et al. | 340/506 |
| 6,530,065 | B1 * | 3/2003 | McDonald et al. | 716/4 |
| 6,535,797 | B1 * | 3/2003 | Bowles et al. | 700/286 |
| 7,103,453 | B2 * | 9/2006 | Deck et al. | 700/292 |
| 2001/0048375 | A1 * | 12/2001 | Maruyama et al. | 340/870.11 |
| 2002/0163447 | A1 | 11/2002 | Runyon et al. | |
| 2003/0084112 | A1 | 5/2003 | Curray et al. | |
| 2004/0225648 | A1 | 11/2004 | Ransom et al. | |
| 2005/0273503 | A1 | 12/2005 | Carr et al. | |
| 2006/0238364 | A1 * | 10/2006 | Keefe et al. | 340/646 |
| 2007/0156291 | A1 * | 7/2007 | Curt et al. | 700/286 |

FOREIGN PATENT DOCUMENTS

| | | |
|---|---|---|
| EP | 1 418 768 | 5/2004 |
| WO | WO 02/058030 | 7/2002 |
| WO | WO 2005/053268 | 6/2005 |

OTHER PUBLICATIONS

International Search Report for Application No. 07008714 dated Oct. 15, 2007.

* cited by examiner

*Primary Examiner*—Carol S Tsai

(57) ABSTRACT

Network-enabled electrical power distribution equipment includes one or more networked intelligent devices coupled to a power distribution system and measuring and storing at least one sensed condition in the power distribution system; a server in the power equipment for storing a document that can be accessed by browsers and that contains data relating to the sensed condition; a content management system in the power equipment for maintaining a document that can be accessed by browsers and that contains a log of information relating to the power equipment; and a user interface for accessing the document containing the log of information and editing the information contained in the log. The log of information relating to the power equipment may be a web log or a wiki. The content management system can be included in a web server in the power equipment, the user interface can include a web browser, and the network can include a LAN, a private WAN and/or a public WAN such as the Internet.

9 Claims, 5 Drawing Sheets

NETWORK-ENABLED ELECTRICAL POWER EQUIPMENT WITH INTEGRATED CONTENT MANAGEMENT SYSTEM

FIELD OF THE INVENTION

This invention is directed generally to network-enabled electrical power distribution equipment, such as switchgear, switchboards, panelboards, motor control centers and the like. The invention particularly relates to such power equipment having an integrated content management system.

BACKGROUND OF THE INVENTION

Microprocessor-based electrical power distribution equipment such as switchgear, switchboards, panelboards, motor control centers accumulate considerable amounts of information concerning the electrical distribution systems to which they are connected, as well as the power equipment itself. A common requirement for such equipment is the performance of regular maintenance and the generation and maintenance of up-to-date records of all testing and improvements performed. This is currently done via manual means or by entering data into a computer-based "maintenance log". These can be misplaced or mismanaged, with uncertainty regarding which documents reflect the official records, which is the latest copy, who is responsible for a given entry in the log, etc.

SUMMARY OF THE INVENTION

In one embodiment of the invention, network-enabled power equipment comprises a networked power monitoring device coupled to a power distribution system and measuring and storing at least one sensed condition in the power distribution system; a server associated with the power monitoring device for storing a document that can be accessed by browsers and that contains data relating to the sensed condition; a content management server for maintaining a document that can be accessed by browsers and that contains a log of information relating to the power distribution device; and a user interface for accessing the document containing the log of information and editing the information contained in the log.

In one particular implementation, the log of information relating to the power distribution equipment is a web log or a wiki. The content management server can be included in a web server in the power equipment, the user interface can include a web browser, and the network can include a LAN, a private WAN and/or a public WAN such as the Internet. In one specific embodiment, the log of information comprises a maintenance record for the power equipment, which can be a switchgear lineup, a switchboard, a panelboard, a control panel or a motor control center.

BRIEF DESCRIPTION OF THE DRAWINGS

The invention may best be understood by reference to the following description taken in conjunction with the accompanying drawings, in which.

DETAILED DESCRIPTION OF THE ILLUSTRATED EMBODIMENT

Although the invention will be described in connection with certain preferred embodiments, it will be understood that the invention is not limited to those particular embodiments. On the contrary, the invention is intended to include all alternatives, modifications and equivalent arrangements as may be included within the spirit and scope of the invention as defined by the appended claims.

Figure 1:
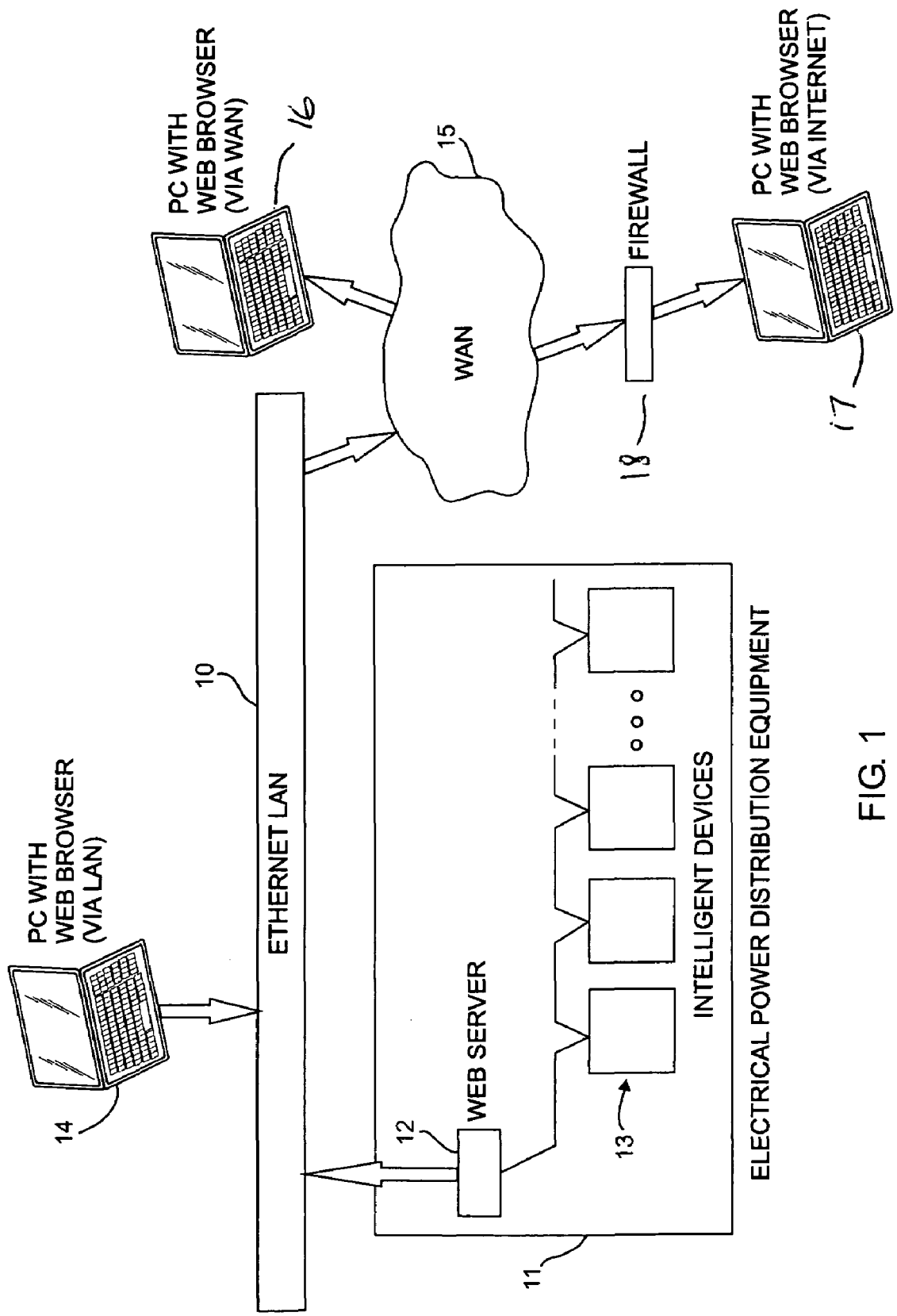
FIG. 1 is a diagrammatic illustration of a network-enabled power equipment that includes a server and intelligent devices (devices with data communications capability)

Referring now to the drawings, and initially to FIG. 1, a network 10 includes electrical power distribution equipment 11 that includes a web server 12 and multiple intelligent devices 13, and a personal computer or workstation 14 that includes a web browser. The network 10 is an Ethernet network or some other form of private LAN, which is typically coupled to a WAN 15 that can include additional personal computers or work stations 16 containing web browsers. The personal computers or workstations 14 and 16 may be any computers operating web browser programs such as Microsoft's Internet Explorer®.

A web server typically stores web pages, i.e., HTML (hypertext markup language) pages or files, that can be retrieved by a web browser. Each web server has a unique IP address and possibly a domain name, and serves up web pages when addressed by a web browser.

The web server 12 provides gateway functions by allowing Ethernet access to the multiple intelligent devices 13. The web server 12 also allows access to custom HTML pages via standard web browsers. These HTML pages may display information from the web server host and/or the intelligent devices 13.

The web server 12 has one or more on-board Ethernet ports, e.g., one for a 10/100Base TX Twisted Pair connection and another for a 100Base Fx connection, and also has an RS-485 serial port for coupling to the intelligent devices 13. The RS-485 port typically supports multiple devices without a repeater.

The same processor that operates the web server 12 is used to operate a content management system that provides a centralized location to store maintenance data, or any other information, about the equipment 11 and its various components, such as the intelligent devices 13, or the power distribution system to which the equipment 11 is coupled. The content management system resides onboard the web server 12 integrated into the power distribution equipment 11, one example of which is the EGX 400 "PowerLogic Ethernet Gateway available from Schneider Electric in Palatine, Ill. The web server 12 is responsible for collecting, storing and distributing user-entered log data. The log data is retrieved from and presented to the user as a wiki or blog, which is served to the user via the web server's HMI (human-machine interface), using the HTTP protocol. The invention is not limited, however, to applications utilizing the Internet or World Wide Web, but rather can be used in any type of network to which the electrical power distribution equipment is connected.

A particularly useful application for the content management system is to provide an on-line maintenance log in which entries can be entered directly into the equipment's own memory, and edited and/or updated by any qualified person using a web browser such as the browser 14 coupled directly to the ethernet 10, or the browsers 16 and 17 coupled to the ethernet 10 via the WAN 15. The web log for any item of equipment on the network can be accessed remotely via the network to view the posted information relating to that particular item. Each web page is specific to a particular item of equipment, and can be accessed directly by its IP address, or from the home page of the web server 12. The web server 12 may also coupled to an internet service provider (ISP) by means of a typical Internet connection such as a cable modem, digital subscriber loop (DSL), etc. Personal computers coupled to the Ethernet 10 via the Internet, such as the personal computer 17 illustrated in FIG. 1, are preferably protected by a conventional firewall 18.

The simple user interface encourages the maintenance of a detailed maintenance history for each component of the electrical power distribution equipment, and automatically records the date and time of each entry, as well as the identity of the person entering the information. The maintenance log is instantaneously available for all authorized persons, and can be integrated easily into other systems, such as asset management programs.

A web log is a website in which items are posted and displayed in chronological order. A typical web log is a hierarchy of text, images, media objects and data, arranged chronologically, that can be viewed via any web browser. A wiki is similar, lacking the chronological element but adding open editing to maintain a record of each individual change that occurs over time. Both the web log and the wiki facilitate an open exchange, collaboration and automatic documentation. They both also permit the use of links to additional information, further enhancing the quality of the equipment documentation with little added effort. The use of a dated log format that is updated periodically is well-suited to a variety of user interface tasks that can be executed using the embedded web server inside the electrical power distribution equipment.

It is preferred to restrict access to the Ethernet gateway by requiring user authentication at the web HMI. Authenticated users may or may not have access to the maintenance log, or may have read-only access to the maintenance log. The Ethernet web server administrator controls access by defining users and groups, and then setting group permissions for each web page resident onboard the ethernet gateway. This authentication mechanism enables the web server to "know" who is editing the maintenance log.

Figure 2A:
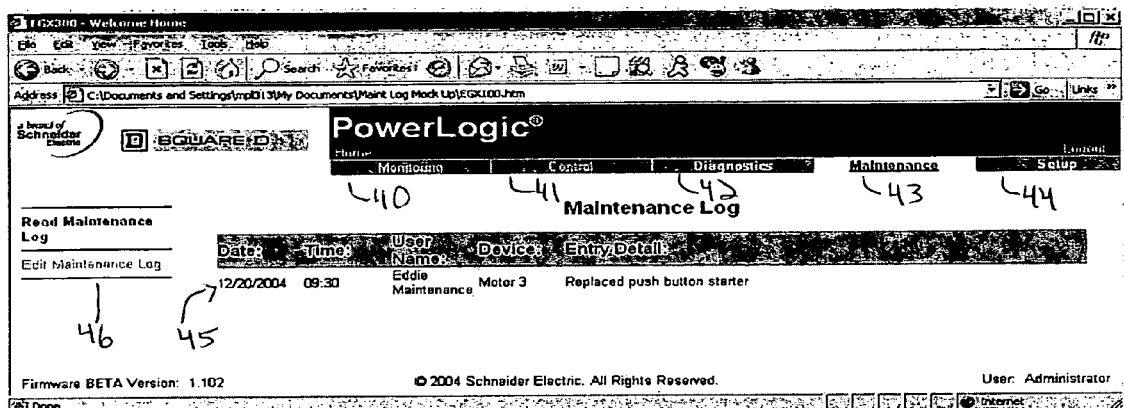
FIGS. 2a, 2b and 2c are screen shots illustrating the successive steps involved in accessing and editing a web log to add a new posting.
Figure 3A:
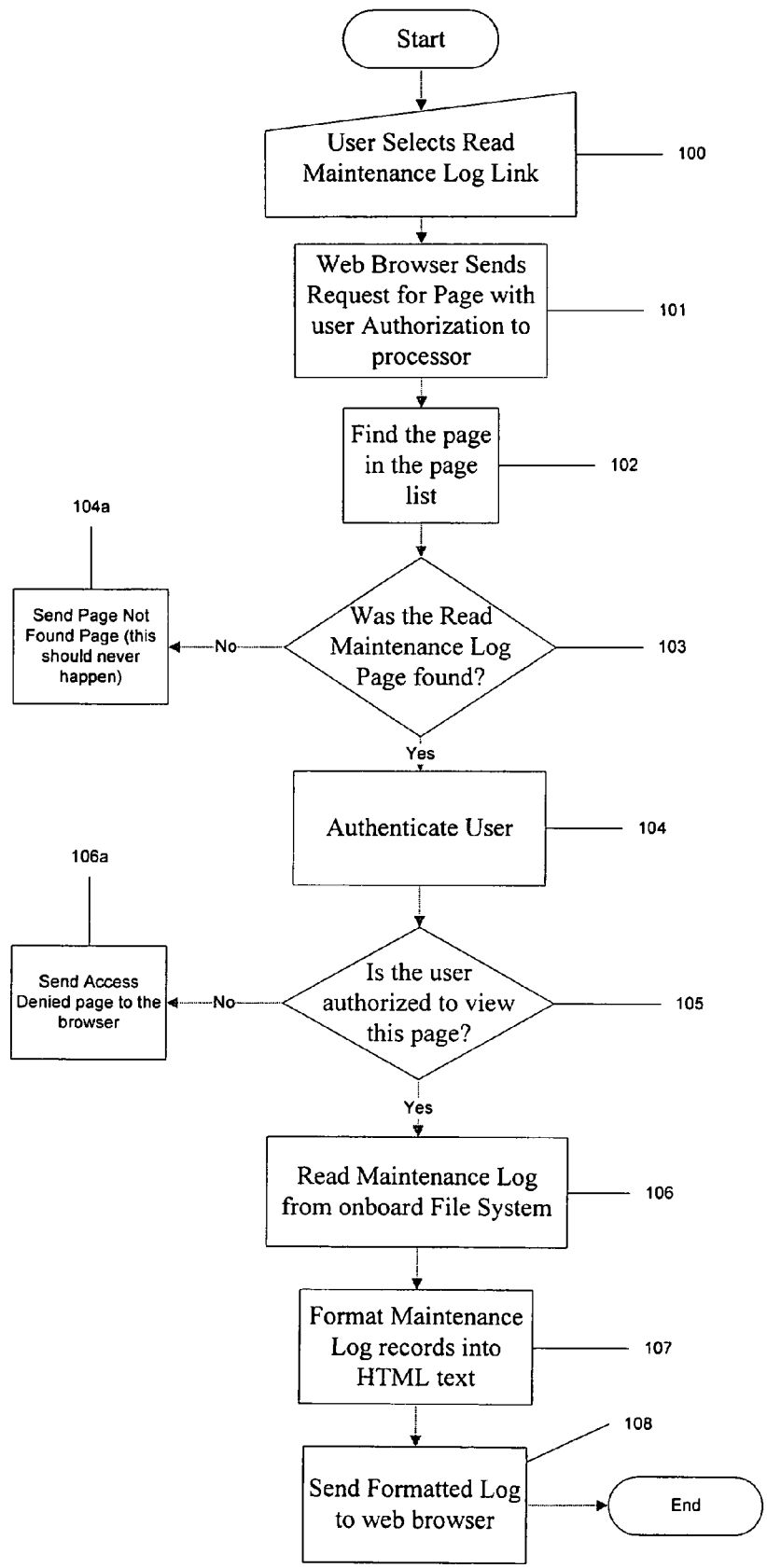
FIGS. 3a and 3b are flow charts of the routines executed by the web server in FIG. 1 to produce the displays in FIGS. 2a-2c.
Figure 3B:
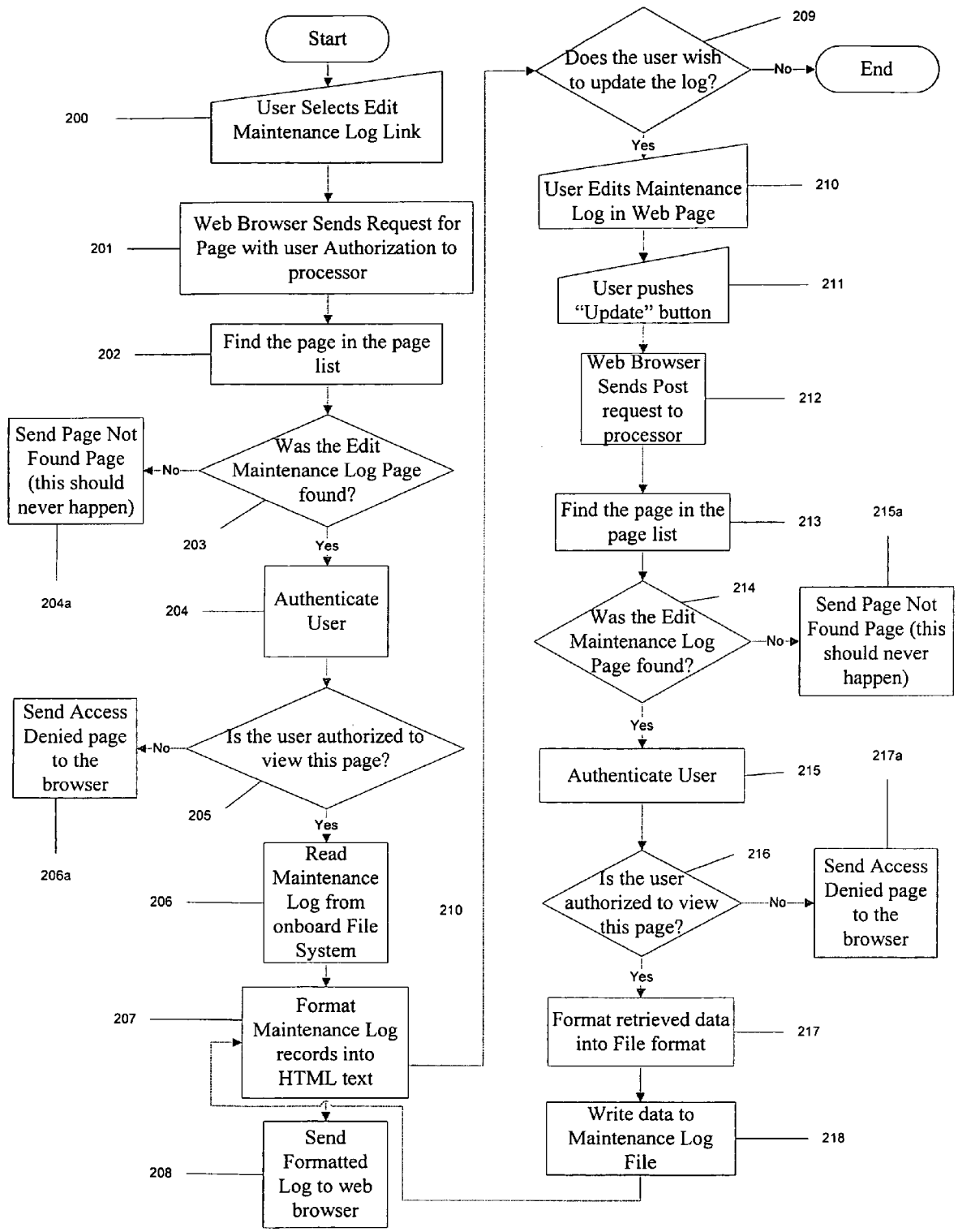

Referring to the screen captures in FIGS. 3*a*-3*c* and the corresponding software flow charts in FIGS. 4*a*-4*b*, an authorized user who logs onto the content management system through a web browser at the HMI is presented with a web page containing a series of tabs such as the five tabs 40-44 illustrated in FIG. 2*a*. In this example, the tabs 40-44 are "Monitoring," "Control," "Diagnostics," "Maintenance" and "Setup." If the user has permission to view and/or edit the Maintenance Log, the "Maintenance" tab will be selectable upon login to the HMI. When the user selects the "Maintenance" tab (by clicking on the hyperlink), a Maintenance sub-menu is displayed. If the user has editing rights, the Maintenance sub-menu will display the two links shown in FIG. 2*a*, namely, "Read Maintenance Log" and "Edit Maintenance Log." If the user does not have editing rights (read-only access), the sub-menu will only display the "Read Maintenance Log" link.

When the user selects the "Read Maintenance Log" link, which is step 100 in the flow chart of FIG. 3*a*, the web browser sends a request (step 101 in FIG. 3*a*) to the web server 12 to display the maintenance log. This request is sent with the user's authorization, via the Ethernet network 10 and using the HTTP protocol. After authenticating the current user, the web server reads the current log data from a file resident onboard the web server, formats the data into HTML text, and sends the text to the web browser that initiated the request.

The web browser sends the web-server processor a request for the "read maintenance log" page, along with the user authorization, at step 101, and the processor attempts to find the requested page in a page list at step 102. Step 103 determines whether the requested page is found, and when the answer is affirmative, the user is authenticated at step 104. If the page is not found, step 103 produces an error signal at step 104*a*. Step 105 determines whether the user is authorized to view the requested page, and if the answer is affirmative, the requested page is read from the onboard file system at step 106. If the user is not authorized to view the page, step 105 produces an error signal at step 106*a*. The requested page is formatted into HTML text at step 107, and then sent to the web browser at step 108. FIG. 2*a* shows the "Maintenance Log" page displayed by the web browser. In the illustrated example, the displayed log already contains one previous entry or posting 45.

If the user wishes to edit the maintenance log, the "edit" request operation is nearly identical to the request operation for the "read" request. The only difference is the HTML elements used to present the data to the user. In the "read" request, the HTML elements are all "read-only." In the "edit" request, the HTML elements are "editable" and a submit or "update" button is added. Additionally, the device names displayed in the "Device" select element on the "Edit Maintenance Log" page are retrieved from the "Device List," which is defined on a "Device List" page located on the "Setup" sub-menu.

When the user selects the "Edit Maintenance Log" link, which is step 200 in the flow chart of FIG. 3*b*, the web browser sends a request (step 201 in FIG. 3*b*) to the web server 12 to display the maintenance log. This request is sent with the user's authorization, via the ethernet 10 and using the HTTP protocol. After authenticating the current user, the web server reads the current log data from a file resident onboard the web server, formats the data into HTML text, and sends the text to the web browser that initiated the request.

The web browser sends the web-server processor a request for the "Edit Maintenance Log" page, along with the user authorization, at step 201, and the processor attempts to find the requested page in a page list at step 202. Step 203 determines whether the requested page is found, and when the answer is affirmative, the user is authenticated at step 204. If the page is not found, step 203 produces an error signal at step 204*a*. Step 205 determines whether the user is authorized to edit the requested page, and if the answer is affirmative, the requested page is read from the onboard file system at step 206. If the user is not authorized to edit the page, step 205 produces an error signal at step 206*a*. The requested page is formatted into HTML text at step 207, and then sent to the web browser at step 208.

Figure 2B:
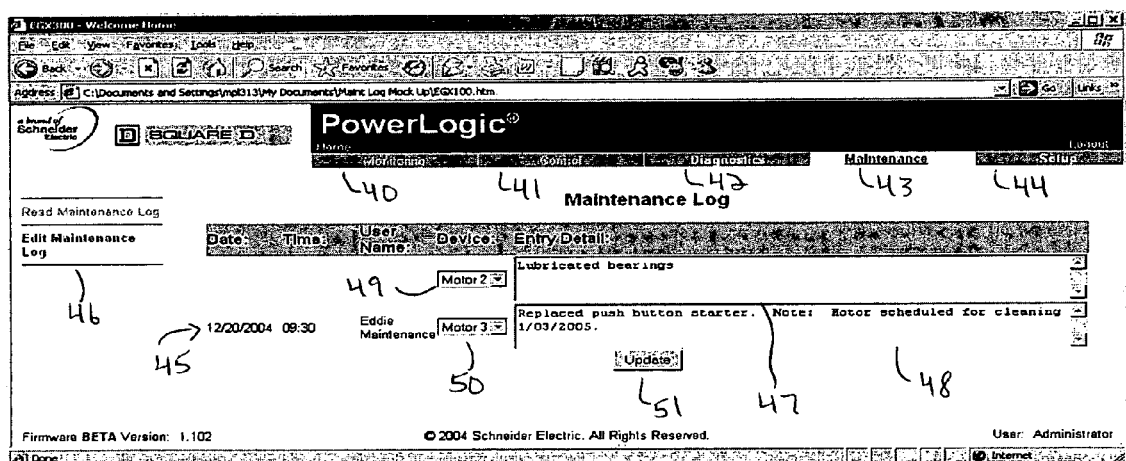
Figure 2C:
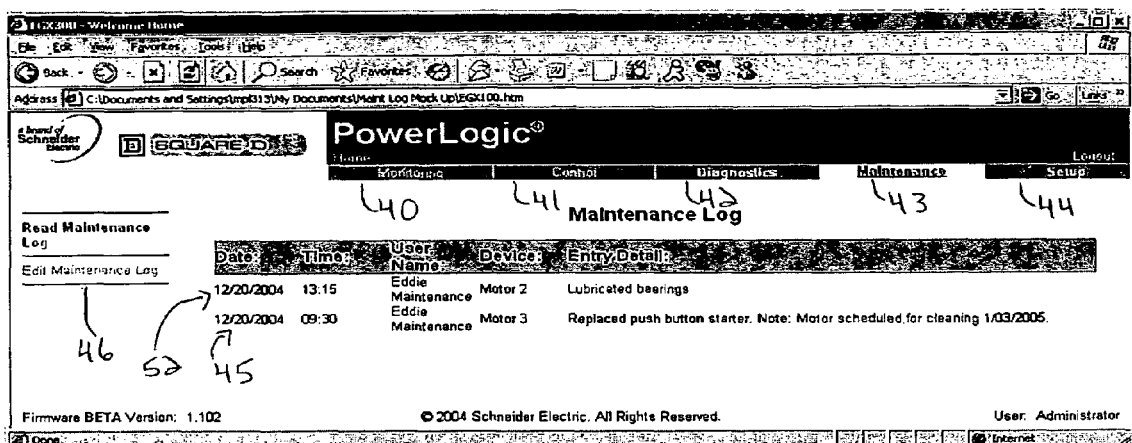

Referring to FIG. 2*b*, the "Entry Detail" web dialog boxes 47 and 48 for both existing and new postings, as well as corresponding "Device" menu boxes 49 and 50, are used to revise existing postings or enter new postings. In the example illustrated in FIG. 2*b*, the user has selected a device from the drop-down menu 49, which indicates that the user wishes to update the log, at step 209 in FIG. 3*b*. The user has edited the existing posting for that device in the corresponding dialog box 47, and has also selected a device from the second drop-down menu 50 and entered a new posting for that device in the corresponding dialog box 48. At step 211, the user clicks on an "Update" tab 51 at the bottom of the display to save the revised and new postings 45 and 52, which causes the web browser to send a post request to the web-server processor at step 212. Upon receiving the post request, the processor attempts to find the requested page in a page list at step 213. Step 214 determines whether the requested page is found, and when the answer is affirmative, the user is authenticated at step 215. If the page is not found, step 214 produces an error signal at step 215a. Step 216 determines whether the user is authorized to edit the requested page, and if the answer is affirmative, the retrieved data is formatted into File format at step 217. If the user is not authorized to edit the page, step 216 produces an error signal at step 217a. The formatted data, which includes the new information along with the current date, time, and user are written to the Maintenance Log File and stored in non-volatile memory at step 218. The system then returns to step 207 to recompile the data in the log into HTML and sends the updated page to the web browser for display, as illustrated in the screen shot shown in FIG. 2c.

The web log or wiki may be used to maintain a documentation index so that an end-user or panel builder can add items such as panel schedules and details of equipment installed, such as descriptions, ratings, etc. Records of changes to the equipment can thus be maintained with accuracy and reliability A user may access the content management system through any web browser connected to the power distribution equipment 11 directly or via the network 10. The power distribution equipment 11 may allow direct access to the web server in that equipment through a communications port on the front panel of the equipment, in addition to the internal Ethernet communication port or ports through which the equipment is permanently connected to the network.

The content management system can also be accessed by a hyperlink, which may be provided in another web page or in an email. For example, the power distribution equipment can be programmed to send an email alert whenever a condition occurs that requires maintenance, and a hyperlink to a maintenance web log or wiki can be automatically included in all such emails.

A hyperlink can be used to provide automatic access to the web page displaying the web log for any selected item of equipment on the network. This enables anyone with access to the hyperlink to quickly and easily access the appropriate web log by simply clicking on the hyperlink. The hyperlink passes to the recipient's web browser the URL for the particular item of equipment identified by the hyperlink. The URL, of course, includes the domain name of the web server, as well as the identification of the directory or folder that contains the web log relating to identified item of equipment. A password can be required as a part of this accessing process.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. Network-enabled electrical power distribution equipment, comprising:
   at least one networked intelligent device coupled to a power distribution system and for measuring and storing at least one sensed condition in said power distribution system,
   a web server integrated with said electrical power distribution equipment for storing a webpage that can be accessed by browsers and the web server contains data relating to said sensed condition and user-entered data associated with said power distribution equipment, said user-entered data being linked to data relating to said sensed condition and the identity of the user,
   a content management system in said web server for maintaining said webpage and that contains a web log or wiki including said data relating to said sensed condition and said user-entered data, and
   a user interface for accessing said webpage containing said web log or wiki of information and editing the information contained in said web log or wiki.

2. The network-enabled electrical power distribution equipment of claim 1 in which said networked power distribution equipment is at least one type selected from the group consisting of switchgear, switchboards, panelboards, control panels and motor control centers.

3. The network-enabled electrical power distribution equipment of claim 1 wherein said information relating to the power equipment comprises a maintenance record for said equipment.

4. The network-enabled electrical power distribution equipment of claim 1 which includes a user interface coupled to said content management system for enabling a user to read and edit said information web log or wiki.

5. The network-enabled electrical power distribution equipment of claim 1 wherein said network includes the Internet.

6. A method of logging information relating to a network-enabled electrical power distribution equipment with at least one networked intelligent device coupled to a power distribution system and an integrated web server, comprising
   measuring and storing at least one sensed condition in said power distribution system,
   storing a webpage in said integrated web server that can be accessed by browsers and storing data relating to the sensed condition and user-entered data associated with said power distribution equipment, said user-entered data being linked to data relating to said sensed condition and the identity of the user,
   maintaining said webpage via a content management system, said webpage containing a web log or wiki of information relating to said power equipment including said data relating to said sensed condition and said user-entered data, and
   accessing said webpage containing said web log or wiki of information and editing the information contained in said web log or wiki.

7. The method of claim 6 in which said network-enabled electrical power distribution equipment is at least one type selected from the group consisting of switchgear, switchboards, panelboards, control panels and motor control centers.

8. The method of claim 6 wherein said information relating to the network-enabled electrical power distribution equipment comprises a maintenance record for said equipment.

9. The method of claim 6 wherein said network includes the Internet.

* * * * *